United States Patent
Lakshminarayanan et al.

(10) Patent No.: US 7,487,181 B2
(45) Date of Patent: Feb. 3, 2009

(54) TARGETED RULES AND ACTION BASED CLIENT SUPPORT

(75) Inventors: Karthik Lakshminarayanan, Issaquah, WA (US); Vikram Kakumani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/422,515

(22) Filed: Jun. 6, 2006

(65) Prior Publication Data

US 2007/0282852 A1    Dec. 6, 2007

(51) Int. Cl.
*G06F 17/00* (2006.01)
(52) U.S. Cl. .................. 707/104.1; 707/101; 707/102; 707/103 R
(58) Field of Classification Search ................ 707/1–10, 707/100–104.1, 200–206
See application file for complete search history.

(56) References Cited

U.S. PATENT DOCUMENTS

| 6,236,332 | B1 | 5/2001 | Conkright et al. |
| 6,701,353 | B1 | 3/2004 | Block |
| 6,816,886 | B2 | 11/2004 | Elvanoglu et al. |
| 2004/0025077 | A1 | 2/2004 | Salem |
| 2004/0220707 | A1 | 11/2004 | Pallister |
| 2005/0045373 | A1 | 3/2005 | Born |
| 2005/0132231 | A1 | 6/2005 | Williamson et al. |
| 2006/0047534 | A1 | 3/2006 | Carolan et al. |
| 2006/0212556 | A1* | 9/2006 | Yacoby et al. .............. 709/223 |

FOREIGN PATENT DOCUMENTS

| WO | WO0198897 | 12/2001 |
| WO | WO2004039101 | 5/2004 |

OTHER PUBLICATIONS

"Asset DB", Compulsion Software, Asset Database and Remote Management software for Windows NT/2000/XP, http://www.compulsionsoftware.com/, printed on Mar. 24, 2006, 3 pages.
"Centralised Troubleshooting of Distributed Networks", http://www.phoenixdatacom.com/ntc.html, printed on Mar. 24, 2006, 6 pages.
"Webzila.com Live Support", http://www.webzila.com/?wz=aboutsupport, printed on Mar. 24, 2006, 4 pages.

* cited by examiner

*Primary Examiner*—Isaac M Woo
(74) *Attorney, Agent, or Firm*—Lee & Hayes, PLLC

(57) ABSTRACT

Targeted rules and action based support techniques are described, in which, operational data collected from a plurality of clients is used to generate support instructions for troubleshooting operational problems of the clients. Clients are provided targeted access to support instructions based upon information included in the support instructions which matches the support instructions to the clients. In an implementation, clients may be placed in one or more groups based on the analysis of the operational data and may receive support instructions corresponding to the group automatically and without user intervention.

16 Claims, 5 Drawing Sheets

TARGETED RULES AND ACTION BASED CLIENT SUPPORT

BACKGROUND

At times, users of computing devices (such as desktop personal computers (PCs), notebook computers, wireless phones, personal digital assistants (PDAs), game consoles, and so on) may experience operational problems that cause the user to obtain support from outside sources to resolve. Operational problems may include a wide range of problems some examples of which are missing files for applications (e.g., word processing, spreadsheets, presentations, note taking, and graphical design), registry errors, memory errors, hardware failures, driver errors and so on. Users may not have the sophistication or technical understanding to determine the source of a particular problem and/or to solve the problem.

One traditional approach used to fixing operational problems involved unsophisticated users placing technical support calls and directly interacting with support personnel (such as a friend or technical support professional) to troubleshoot an operational problem with a computing device. The support personnel, via direct interaction (e.g., a phone call), might offer a number of items to try and guide the user through troubleshooting steps. Thus, a lengthy back and forth conversation with support personnel may be involved to identify and solve the particular operational problem for a single client. Further, this traditional support technique may be repeated for each client and each time a problem occurs or reoccurs.

In other cases, the unsophisticated users may not even recognize or may ignore operational problems which adversely effect performance of the computing device and might contribute to negative impressions of the providers of the computing device, and hardware or software for the device. Thus, the traditional approach to resolving operational problems may be frustrating and time consuming for users, inefficient and costly to those providing support to large number of users, and may adversely impact the reputation of providers of devices hardware, and software when problems go unattended.

SUMMARY

Rules and action based client support techniques are described. In an implementation, a method is employed to produce a variety of support instructions from operational data provided by clients. A service collects operational data from a plurality of clients corresponding to a plurality of operational problems experienced by the clients. The operational data is analyzed to produce a plurality of sets of support instructions which each correspond to one of the operational problems, and which are associated with the clients. Based on the associations, the service provides the clients targeted access to corresponding support instructions which are applicable to them.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
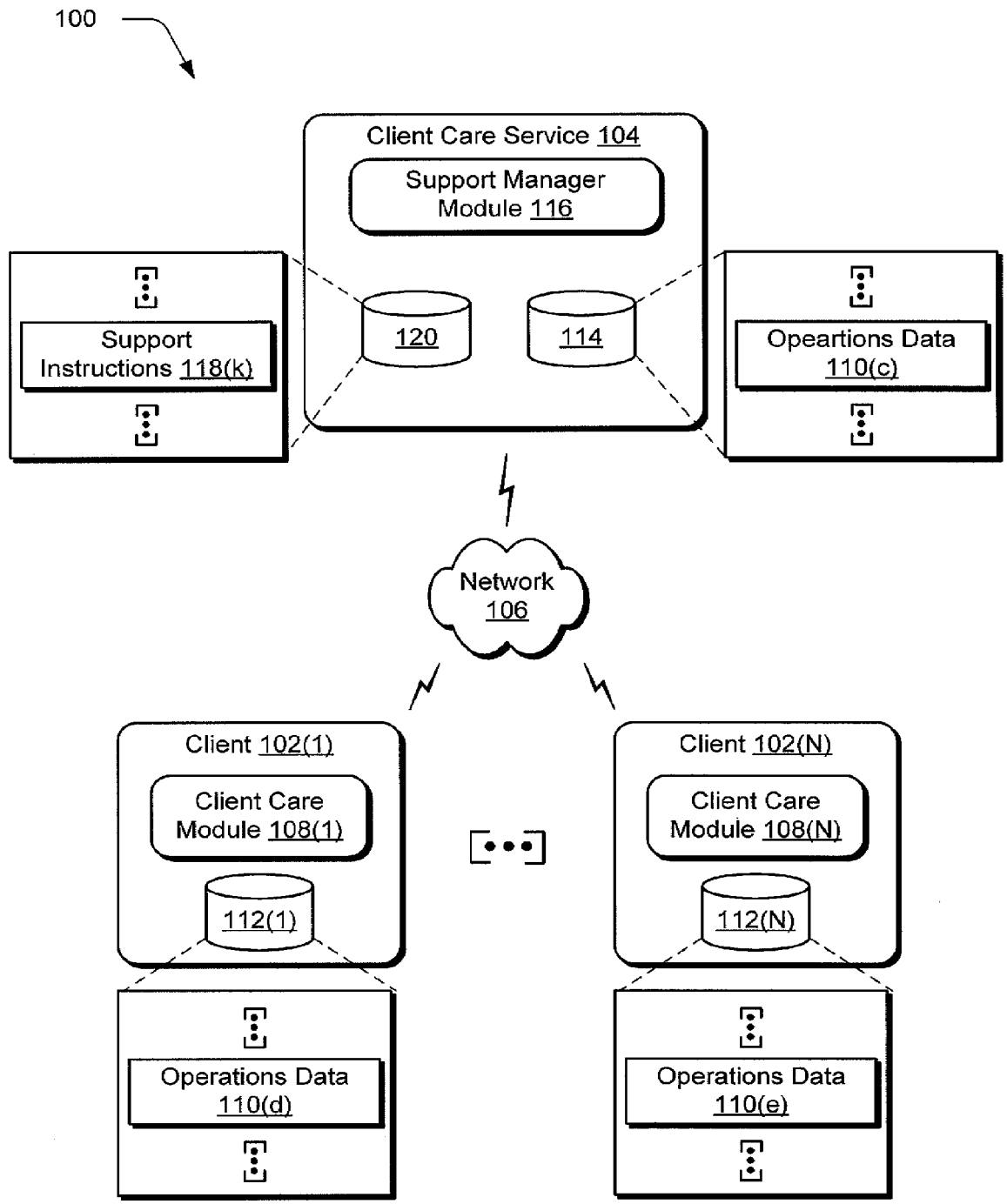
FIG. 1 is an illustration of an environment in an exemplary implementation that is operable to employ rules and action based support techniques.

Maintaining the health and performance of computing devices is becoming increasingly complex. Users of computing devices may be unsophisticated and may not know how to discover or respond to operational problems with a computing device, including problems with the hardware, software, associated peripheral devices, and so on.

A traditional technique for addressing operational problems is for a user to place a technical support call to an expert, a support technician or the like. In a verbal conversation, the expert or support technician works with the user to diagnose the problem and guides the user through troubleshooting steps. However, this technique may be lengthy, take up a significant amount of time of the user and technician (which may be costly to both), and may be repeated if a problem reoccurs or for each of a plurality of clients with the same problem.

Accordingly, rules and action based support techniques are described in which operational data is collected at a service from a plurality of clients and is analyzed to produce a plurality of sets of support instructions for resolving operational problems of computing devices. A single set of instructions may be accessed by or distributed to a plurality of clients to address a common operational problem.

For example, a set of clients may each execute an instant messaging application and experience a common error such as failure to connect to a corresponding instant messaging service. In this case, perhaps each of the respective instant messaging applications is directed to an old location for the service. The clients may execute a support module which detects the error, collects operational data, and communicates it to the service. The service analyzes the data to diagnose the problem. Based on the analysis, a set of support instructions are produced to be used to troubleshoot and fix the problem. In this example, the instructions include actions to be performed by the clients, such as actions which cause the instant messaging application to be redirected to the proper service location.

In an implementation, the support instructions associated with a particular problem are communicated to a plurality of clients identified as having the particular problem and are performed by the clients automatically and without user intervention. For example, the support instructions may be associated with one or more particular problems, with individual clients and/or groups of clients. For instance, a group may be formed on the basis of the instant messaging problem above, such as a group including those clients who provided the service with operational data related to the problem. The service may then automatically provide the group members the support instructions corresponding to the instant messaging problem. Other clients who are not included in the group do not receive the instructions. Therefore, these techniques target support to clients for a variety of operational problems.

In the following discussion, an exemplary environment is first described that is operable to perform client category configuration techniques. Exemplary procedures are then described which may be employed in the environment, as well as in other environments.

Exemplary Environment

FIG. 1 is an illustration of an environment 100 in an exemplary implementation that is operable to employ rules and actions based support techniques. The illustrated environment 100 includes a plurality of clients 102(1), 102(N) that are communicatively coupled to a client care service 104 over a network 106. While a single client care service 104 is depicted, it is contemplated that the functionality associated with client care service 104 may be implemented by a plurality of services, which may each provide the same functions or may divide different functions between themselves.

The clients 102(1)-102(N) may be configured in a variety of ways for accessing the network 106. For example, one or more of the clients 102(1)-102(N) may be configured as a computing device, such as a desktop computer, a mobile station, an entertainment appliance, a set-top box communicatively coupled to a display device, a wireless phone, a game console, and so forth. Thus, the clients 102(1)-102(N) may range from full resource devices with substantial memory and processor resources (e.g., personal computers, game consoles) to low-resource devices with limited memory and/or processing resources (e.g., traditional set-top boxes, handheld game consoles). The clients 102(1)-102(N) may also relate to a person and/or entity that operate the clients. In other words, one or more of the clients 102(1)-102(N) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The clients 102(1)-102(N) are each illustrated as having a respective client care module 108(1)-108(N). The client care modules 108(1)-108(N) are representative of a variety of integrated functionality and are operable to monitor and enhance the health, security and performance of the respective clients 102(1)-102(N). In an implementation, client care modules 108(1)-108(N) are configured to operate in combination with client care service 104 accessible to the clients 102(1)-102(n) via network 106 to provide a comprehensive suite of services related to the health and performance of respective clients. For instance, the client care modules 108 (1)-108(N) may integrate a wide range of client care functionality examples of which include antivirus, antispyware, and firewall to help protect clients 102(1)-102(n) from viruses, worms, Trojan horses, hackers, and other threats. Further examples of client care functionality include automatic backup and restore, automated tune-up for increased performance, defragmentation, software and security updates.

In an implementation, the client care modules 108(1)-108(N) are configured to provide rules and action based support techniques for fixing operational problems with respective clients. Client care modules 108(1)-108(N) may be configured to monitor a respective one of clients 102(1)-102(N). A variety of operations data may be gathered or generated from this monitoring, such as periodic data, data collected when a particular operational problem occurs, current and/or historic client settings, and so forth.

Clients 102(1)-102(N) are depicted as having respective operations data 110(d), 110(e) (where "d" and "e" can be any integer from one to "D" and "E", respectively) in respective storage 112(1)-112(N). Each client may have various operations data 110(d), 110(e) which may correspond to the client, to particular operational problem encountered, and so forth. Such data may be communicated by clients 102(1)-102(N) to the client care service 104. For instance, this operations data may be uploaded at period intervals over the network 106 to the client care service 104 and stored in storage 114 as operations data 110(c). For purposes of the following discussion, operations data 110(c), 110(d), 110(e) may be referred to herein collectively as operations data 110. Operations data 110 may be configured in a variety of ways further discussion of which may be found in relation to FIG. 2.

The client care service 104, as illustrated in FIG. 1, includes a support manager module 116 that is representative of functionality to generate and provide support instructions for troubleshooting of operational problems of clients 102(1)-102(N), which may include the collection via network 106 of operations data 110 communicated from a plurality of clients. The operations data 110 may be collected via support manager module 116 from a plurality of clients 102(1)-102(N) and analyzed to produce instructions configured for troubleshooting operational problems (e.g., technical support) of the clients 102(1)-102(N). The support manager module 116, when executed, may provide a variety of functions including but not limited to managing the support service and access to support service, collecting and storing operations data 110, analysis of data, generating instruction for use by the clients, communication with clients, and so forth.

In an implementation, the client care service 104 may also employ the support manager module 116 to provide a plurality of support instructions 118(k) (where k may be any integer from one to "K") which are illustrated as being stored in storage 120. For instance, operations data 110 obtained by the client care service 104 from clients 102(1)-102(n) may be analyzed to produce the support instructions 118(k). The support instructions 118(k) may correspond to one or more operational problems described in the operational data 110 and/or to a particular one and/or group of the clients 102(1)-102(N). Generally clients 102(1)-102(N) obtain (e.g., may gain access to and/or are provided with) corresponding support instructions 118(k) to determine if a particular operational problem applies based on rules included in the instructions 118(k), and to obtain and/or perform actions specified for troubleshooting applicable problems. Accordingly, the instructions 118(k) may be configured in a variety of ways to describe associations of clients 102(1)-102(N) (e.g., groups, categories, matching to corresponding instructions and so forth), operational problems, rules for identifying operational problems on clients, actions for troubleshooting problems and so forth.

Clients may access the one or more support instructions 118(k) from storage 120 via network 106. Further, the client care service 104 may communicate the one or more support instructions 118(k) to the plurality of clients 102(1)-102(N) in a number of ways, such as automatically, on demand, periodically, and so forth. Thus, client care service 104, and more particularly the support manager module 116, may incorporate functionality to produce support instructions 118(k), to maintain and manage client access to the support instructions 118(*k*), to provide the instructions to clients 102(1)-102N), and so on. Further discussion of the production and utilization of support instructions 118(*k*) for support of operational problems may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the rules and action based client support techniques described below are platform-independent, meaning that the techniques may be implemented on a variety of commercial computing platforms having a variety of processors.

Figure 2:
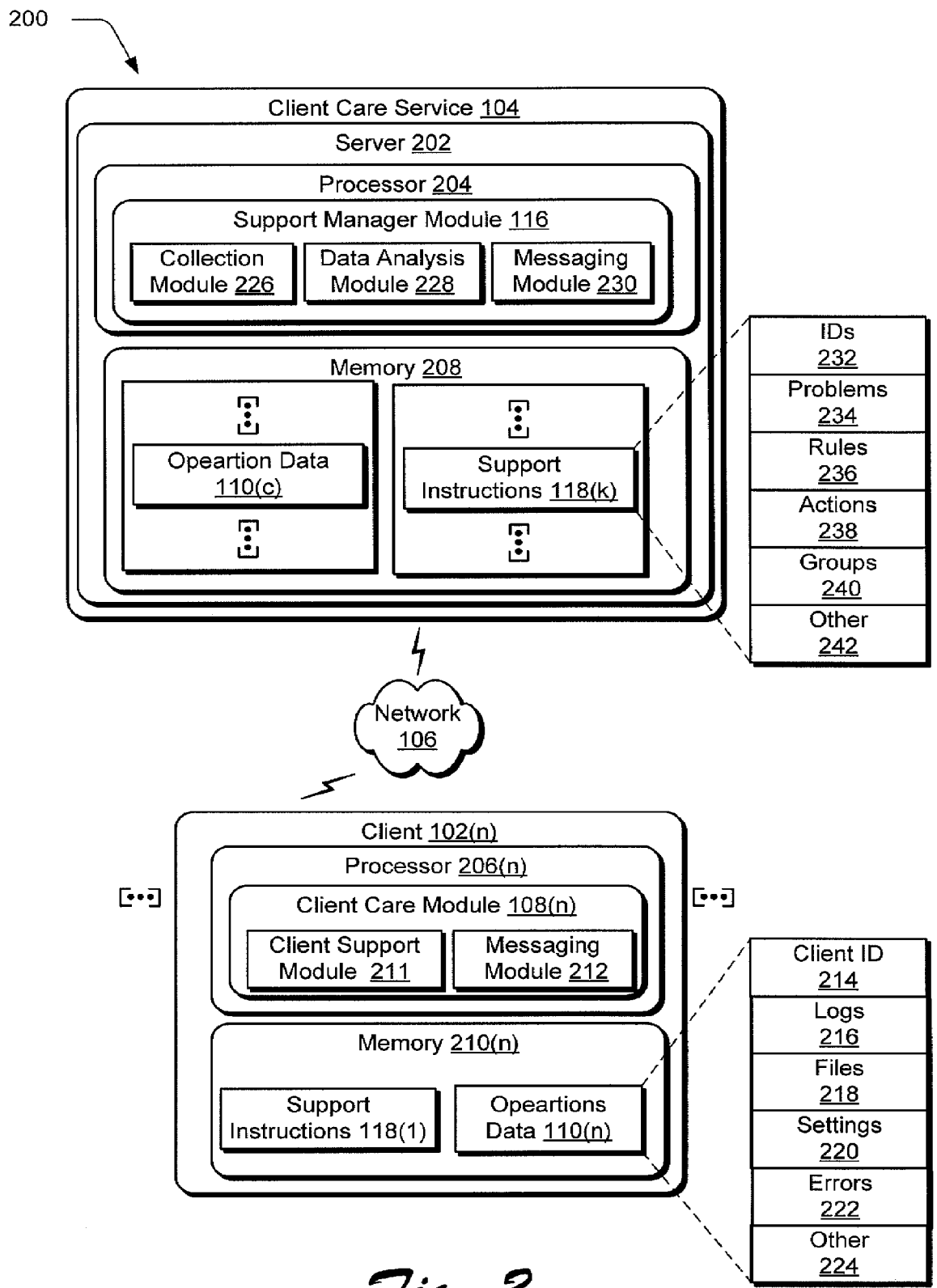
FIG. 2 is an illustration of a system in an exemplary implementation showing a client care service and a plurality of clients of FIG. 1 in greater detail.

FIG. 2 is an illustration of a system 200 in an exemplary implementation showing the client care service 104 and the plurality of clients of FIG. 1 in greater detail. The client care service 104 is illustrated as being implemented by a server 202, which although a single server 202 is illustrated, server 202 may be representative of multiple servers, e.g., a server cluster. The client 102(*n*), which in FIG. 2 is illustrated as a client device, may be representative of any one of the clients 102(1)-102(N). Further, the server 202 and the client 102(*n*) are illustrated as having respective processors 204, 206(*n*) and memory 208, 210(*n*).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210 is shown, respectively, for the server 202 and the client 102(*n*), a wide variety of types and combinations of memory may be employed, such as random access memory (RAM), hard disk memory, removable medium memory, and other types of computer-readable media. For example, the support instructions 118(*k*) may be maintained in RAM while the operations data 110(*c*) may be maintained in a hard disk drive. A variety of other examples are also contemplated.

The client 102(*n*) is illustrated as executing the client care module 108(n) on the processor 206(*n*), which is also storable in memory 210(*n*). The client care module 108(*n*), as previously described, is executable to provide a comprehensive, integrated, and automatic computer health service which may include rules and action based client support functionality. Naturally, while rules and action based client support functionality is described as integrated in a comprehensive computer health service, the functionality for performing rules and action based client support may in one or more implementations be provided separately such as via a standalone application.

In an implementation depicted in FIG. 2, however, functionality for rules and action based support provided is integrated with client care module 108(*n*) and may be provided by one or more sub-modules. For instance, FIG. 2 depicts client care module 108(*n*) as including a client support module 211 and a messaging module 212. Client support module 211 operates to identify operational problems of the client 102(*n*), to gather associated operational data 110(*n*) related to or relevant to the problems, and to apply rules and perform actions specified for troubleshooting a problem, such as those from a support instructions 118(*k*) corresponding to a particular problem.

Messaging module 212 represents functionality to provide communication between the client 102(*n*) and the client care service 104. For instance, messaging module 212 may operate to communicate operation data 110(*n*) to the client care service 104, to report operational problems, to seek and get access to support instructions 118(*k*) maintained by client care service via 104, to provide feedback regarding performed operations or otherwise to communicate to the client care service 104. Further, messaging module may operate to download one or more of the plurality support instructions 118(*k*) to the client 102(*n*), which are represented in FIG. 2 by support instructions 118(1) stored in memory 210(*n*). A variety of modes of communication are contemplated, some examples of which are individual messages between the service 104 and client 102(*n*) according to Simple Object Access Protocol (SOAP), or other protocols, broadcast messaging posts via a broadcast messaging system, periodic postings and polling at regular intervals, as well other suitable communication modes between a client 102(*n*) and service 104.

The operations data 110(*n*) collected in response to operational problems may be configured to include a wide range of information associated with a client 102(*n*) for troubleshooting operational problems. For instance, operations data 110 (*n*) stored in memory 210(*n*) of client 102(*n*) as depicted in FIG. 2 may include: one or more client identifier 214 to associate the client with the operational data 110(*n*); a variety of logs 216 (e.g., data describing historical data and settings, changes to settings for software/hardware, and so on), various files 218 or file list (e.g., data files such as DLLs, text files, lists, profiles, application files and so on which may be relevant to a problem, may be unknown or corrupted, or may be identified as missing); client settings 220 (e.g., client configurations for devices, hardware/software, drivers, internet settings and so on), and error messages 222 associated with operational problems which may describe the problem such as by a code, text and so on. A variety of other 224 operational data which may be used to identify and resolve operational problems of a client 102(*n*) may also be included, such as the type of client device, peripheral devices used by the client, user profiles, installed software profiles or lists, data input by a user such as to describe a problem, results of previous troubleshooting steps, and so on.

In an implementation, the client identifier 214 is a unique and anonymous identifier associated with a client 102(*n*), such that the client care service 104 may not know the association of the client and the ID. The client 102(*n*) provides the ID 214 when reporting operational problems and associated operational data 110(*n*). The client care service 104 may then anonymously associate the client with a problem, or a group of clients using the ID 214. The client 102(*n*) may then reference this unique ID 214 when seeking information relevant to the client 102(*n*), for instance to access one or more support instructions 118(*k*) specifically targeted to the client 102(*n*) and/or problems associated with the client 102(*n*). In this manner, client 102(*n*) may receive targeted rather than global support and is able to maintain privacy and security in interactions with the client care service 104.

Client care service 104 includes a support manger module 116 which in FIG. 2 is depicted as executable on processor 204 and is also storable in memory 208. Support manger module 116 may provide a variety of functionality for rules and action based client support as part of an integrated client health service previously described or as a stand alone application. Support manger module 116 is further illustrated as including a variety of sub-modules to provide functionality for rules and action based client support, including a collection module 226, a data analysis module 228 and a messaging module 230.

Collection module 226 represents functionality operable to collect and store operations data 110 from a plurality of clients 102(n). The operations data 10(n) of the clients 102(n) may be uploaded to the client care service 104 over the network 106 (such as, each time a problem occurs, at periodic intervals, when a threshold amount of data has been generated, and so on) and stored as operations data 110(c) in memory 208. The operations data 110(c) may then be processed by the support manager module 116 of client care service 104 in a variety of ways.

Data analysis module 228 is representative of functionality to perform analysis on collected operational data 110(c) from a plurality of clients 102(n). For example, data analysis module 228 may be executed to process operations data 110(c) and to generate one or more support instructions 118(k) depicted as storable in memory 208 of client care service 104. Processing by data analysis module 228 may encompass a variety of processing, some examples of which are matching or association of collected data to known problems, identification of unknown problems, statistical analysis, associating clients with problems, associating rules and/or actions with problems, associating or placing clients into various categories and groups, organizing analyzed data into support instructions 118(k), and so forth.

Further, data analysis module 228 may permit users and in particular managers, administrators or providers of client care service 104 access to the collected operational data 110(c), such as through an exposed user interface. These users may then perform manual analysis, production, publishing, editing and so forth of support instructions 118(k) via data analysis module 228 and/or the exposed user interface. Such manual input may be used in combination with automated analysis performed by the data analysis module 228. Thus, support instructions 118(k) may include a combination of automatically generated analysis and manually produced analysis.

Messaging Module 230 represents functionality associated with support manager module 116 to communicate with a plurality of clients 102(n), for instance to receive operations data 110(c), to provide indications that support instructions 118(k) have been generated for various problems, to send messages back and forth, to process requests, to provide support instructions 118(k) to clients 102(n), and so on. Messaging module 230 may further operate to provide and manage the access of clients 102(n) to support instructions 118(k), such as through the use of client accounts, authentication of clients 102(n) and so forth.

In an implementation, the respective messaging modules 212, 230 of clients 102(n) and client care service 104 are a part of a broadcast messaging service. In this implementation messaging module 230 is configured to post or broadcast messages such that they are accessible to a plurality of clients 102(n). These messages may include information that clients 102(n) may utilize to determine if support instructions 118(k) applicable to the clients 102(n) are available and where to obtain applicable instructions 118(k). For instance, a posted message may indicate support instructions 118(k) related to a particular operational problem and corresponding to certain clients 102(n) have been generated or updated with new information. In an implementation, the posted message uses a client's identifier 214 provided in operational data 110 to associate the message (and corresponding support instructions 118(k)) with the particular client 102(n). Client 102(n) via messaging module 212 may poll the server 202 periodically, on demand and so forth to determine by referencing their particular client ID 214 if any new messages which are applicable have been posted, and may then perform actions in response to any applicable messages, may retrieve corresponding support instructions 118(K), and so on.

Client care service 104 is depicted as having a plurality of support instructions 118(k) in memory 208. As previously described the support instructions 118(k) may include a variety of information which may be utilized by clients to troubleshoot corresponding operational problems. Further, support instructions 118(k) may include information identifying various associations, matching, and relationships between clients and operational problems (e.g., targeting information), such that the instructions 118(k) may be targeted to particular clients 102(n).

Thus, each set of support instructions may correspond to one or more clients 102(n) and accordingly may have one or more associated identifiers (IDs) 232 which may corresponds to client IDs 214 of individual clients 102(n). Thus, the ID's 232 in a set of instructions 118(k) may be compared to a client ID 214 to determine if the support instructions 118(k) are applicable to the client.

Further, each of support instructions 118(k) may identify one or more operational problems 234 which may be matched to IDs 232. The support instructions 118(k) may further include rules 236 for determining if a problem exists on a client and a set of actions 238 to perform for troubleshooting and fixing a corresponding problem.

In an implementation, support instructions 118(k) may be configured to identify categories or groups 240 of clients and accordingly to associate other information (e.g. IDs 232, problems 234, actions 238 and so forth) with the respective groups 240. A variety of other data 242 may be also be included in support instructions 118(k) such as indications of the relative severity or of the problems 234, statistics, information or links to additional support, files such as additional or detailed instructions for a user, and so forth. Further discussion of the configuration and utilization of support instructions 118(k) for rules and action based support techniques including client groupings may be found in relation to FIG. 3-5.

Exemplary Procedures

The following discussion describes rules and action based client support techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
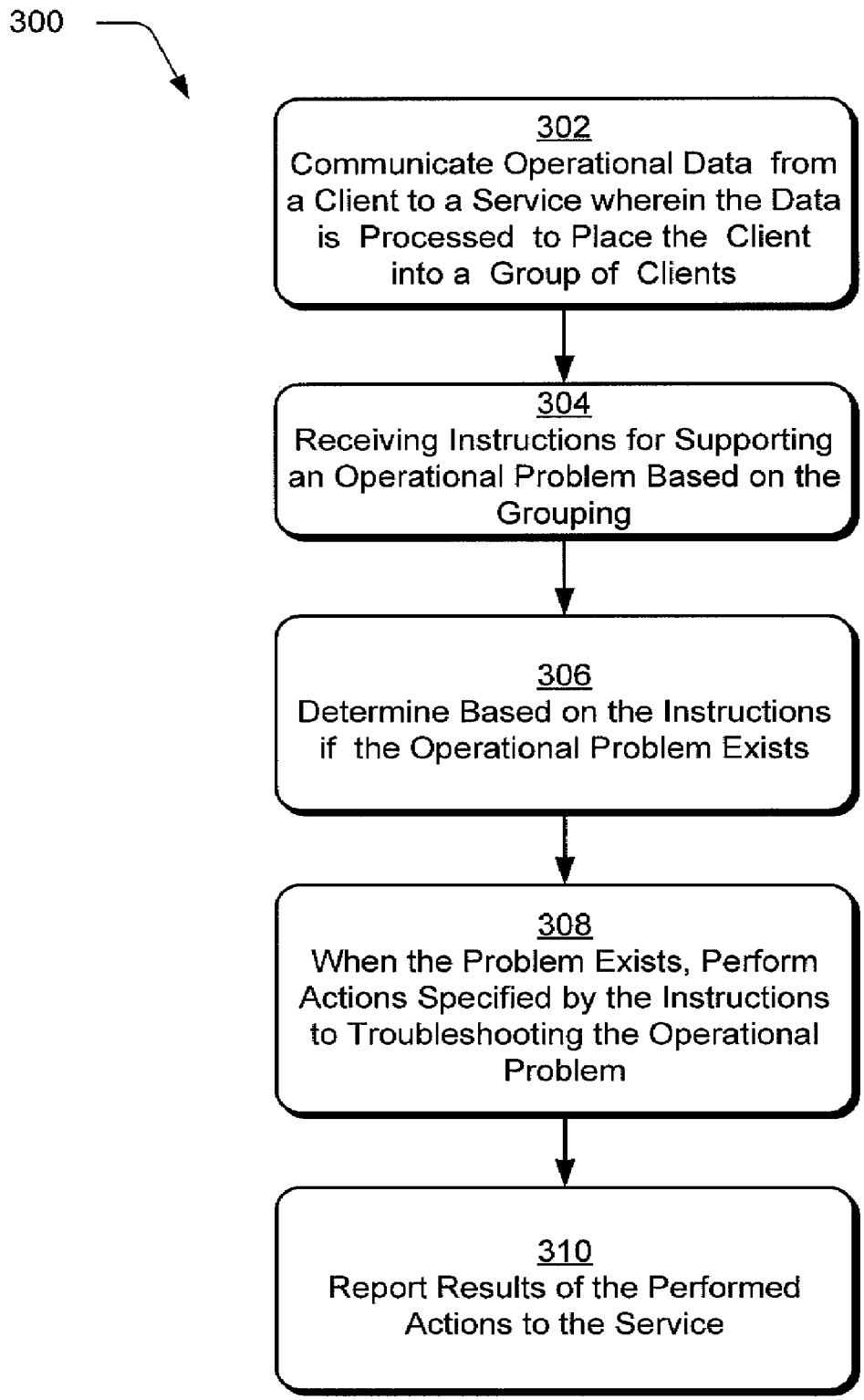
FIG. 3 is a flow diagram depicting a procedure in an exemplary implementation in which client receives support instructions based on the client's inclusion in a client group.

FIG. 3 depicts a procedure 300 in an exemplary implementation in which a client provides operational data which is used to group the client and receives support instructions based upon the grouping. A client communicates operational data to a service which is used to place the client into a group of clients (block 302). For example, the client 102(n) may execute the messaging module 212 to communicate data, such as operational data 110(n) to client care service 104. In this example, operational data 110(n) may be collected by client support module 211 executed on the client 102(n), such as when client 102(n) first signs up or uses the service 104. For instance, client 102(n) may supply a user profile describing characteristics of the client, users of the client and so forth. Additionally or alternatively, the client support module 211 may monitor performance of the client 102(n) and collect data 110(n) when an operational problem occurs.

The operational data communicated to the client care service 104(n) may be processed such as by the data analysis module 228 to place the client into a group of clients. A variety of client categories or types groups are contemplated which may be determined from operational data 110 provided by clients 102(n). Groups of clients are found based on common characteristic indicated in the operation data 110 obtained from a plurality of the clients. For instance, clients may be grouped on the basis of common operational problems, the type of client device, the location of clients, the use specified for the client, the closeness of configurations or settings for hardware and software, user profiles and so forth. In one example clients reporting the same problem are automatically placed in the same group. In other cases similar characteristics or qualities of clients may be used to form the groups, such as grouping based upon a particular combination of settings, hardware software, intended uses, and so on. As noted above, clients 102(n) may also provide a unique and anonymous identifier 214 with operations data 110 which may accordingly be used to anonymously place a client 102(n) into a group of clients.

Data analysis module 228 further may generate support instructions 118(k), which may include groups 240 to match clients 102(n) to the support instructions 118(k) or portions thereof. Thus, a set of instructions 118(k) maybe tailored or targeted to a particular group 240 of clients. Data analysis module 228 may be configured to identify and perform such groupings for inclusion in support instructions 118(k). These groups 240 may then be used to provide targeted support instructions 118(k) to clients 102(n), such as by allowing access based on the grouping, notifying clients of the group association, and/or by providing instructions to clients based on the groups automatically and without user intervention.

Instructions for supporting an operational problem are received by the client 102(n) based on the grouping (block 304). The client support module 108(n) and more particularly the messaging module 212, for instance, may be configured to receive one or more sets of support instructions 118(k) from the service via network 106. In FIG. 2, a set of instructions 118(1) are illustrated as stored in memory 210(n) to represent instructions received by the client 102(n). In an implementation, the client 102(n) receives support instructions 118(1) based on the grouping, automatically and without user intervention. Further, the client 102(n) may receive support instructions 118(1) which correspond to a particular problem experienced and/or reported by another group member even though the client has not itself experienced or reported the problem.

For instance, when one group member or a specified number of group members experiences and reports an operational problem, the client care service 104 may respond by automatically providing corresponding support instructions 118(k) to each member of the group without user intervention or client requests. Thus, a client 102(n) may receive relevant support instructions 118(k) based upon a group to which the client 102(n) belongs and before the client 102(n) otherwise identifies or experiences the particular problem to which the support instructions 118(k) pertain. In other words, the client 102(n) may receive and perform the rules 236 and actions 238 for a problem 234 associated with a group 240 to correct a latent or dormant problem, even before the problem 234 actually manifests itself in a manner which generates an error or is detectable to the a user of the client 102(n).

It is noted that a variety of operational problems are contemplated which may be detected, supported and resolved according to the devices and techniques described herein. Generally, operational problems refer to instances in which software or hardware fails to properly perform its intended function. Often error messages or log entries are produced in these instances which the client support module 211 may monitor for in order to detect the operational problems and to take action. Operational problems for example may include: registry errors, missing or corrupted files for applications or system software, driver errors; improper system settings; installation errors; botched installation, software or hardware conflicts, improper user actions, and so on. A variety of other instances in which software or hardware fails to properly perform are contemplated.

For example, a user or group member may attempt to launch an application program for email which fails because a critical DLL file is missing. An error occurs which causes the group member to collect operational data 110 and provide it to the service 104. Service 104 may produce support instructions 118(k) based in part on the operational data 110 provided. In this example, these instructions might instruct actions 238 to perform such as obtaining and installing the missing DLL from a specified location. Further, the instructions might specify clients to which the instructions or problems applies. Assume now that the client 102(n) has been placed into a group 240 with the user group member providing data on the DLL problem. In this case, client 102(n) may not have recently used the email program and accordingly has not experienced or reported the DLL problem. However, the DLL problem may be associated with the group such as by operational data provided the other group members and accordingly, the client 102(n) receives the set of instructions for the email DLL problem, based on this grouping.

The client determines based on the instructions if the client has the operational problem (block 306). For instance, the instructions of the previous example addressing the missing DLL file may include various rules 236 configured to be used to determine whether the problem exists on a client. In one instance, rules 236 may simply be matching of the client id 214 to the problem 234 or to a group 240. Thus, a rule 236 may specify for a number of client IDs 214 that if you are the client 102(n) with a certain id 214 then you are have this problem 234. Other rules 236 may involve checking for symptoms of a particular operation problem 234, such as in the email example above, checking for the DLL. In other instances, rules 236 may specify other symptoms such as registry entries, version numbers, log entries and so forth which may be indicative of a particular problem. Set of support instructions 118(k) in certain cases simply include sets of client ids such as ID's 232 depicted as include with instructions 118(k) in FIG. 2 which are matched to particular problems 236, based upon reporting of the particular problem or based upon a grouping. Thus, the instructions 118(k) may be used by a client 102(n) to determine if they have an operational problem. In the present example, client 102(n) may search for the particular DLL. Assuming now that the DLL is missing, the client 102(n) determines that the problem 234 exists at the client 102(n), When the problem exists, client performs actions specified by the instructions to troubleshoot the problem (block 308). Continuing the previous example, client 102(n) may access the received instructions 118(k) to perform specified actions 238 for correcting the particular missing DLL for the email application. Client support module 211 may operate to access the support instructions 118(1) which have been received to perform the specified actions 238, such as from memory 210(n). As indicated instructions 118(1) in this example may simply indicate where the DLL may be obtained.

A variety of actions 238 in support instructions 118(k) which address various problems 234 are contemplated. For instance, actions 238 may include reinstalling programs, finding and downloading files, restarting, registry editing, uninstalling programs. The actions 238 may be instructions configured to cause the client care module 108(n) and more particularly the client support module 211 to perform the steps to resolve or troubleshoot an associated problem 234.

In an implementation, actions 238 may be instructions specifying additional collection of operational data 110 to be sent to the service 104 for further analysis of the associated problem 234. In the continuing example, the actions 238 may request additional information about the email application, such as email settings, name of the provider, and so on. The service 104 may then analyze the new data, develop new rules 236, actions 238, and so on and may update the corresponding support instructions 118(k) with new information. Thus, the rules and action based support techniques may be iterative.

The client reports the results of the performed actions to the service (block 310). Again using the missing DLL as an example, the client 102(n) may indicate that the DLL was obtained and installed and that the email program operated properly. In the event that additional operational data 110 is requested, the client may report the requested operational data 110. In some instance the problem 234 will be resolved by the performance of the actions 238 and accordingly the results will indicate that the problem has been fixed. In other instances, the problem 234 may persist and an iterative process of providing operational data, receiving instructions, performing actions, and providing results and/or more data may occur until the problem is fixed.

Figure 4:
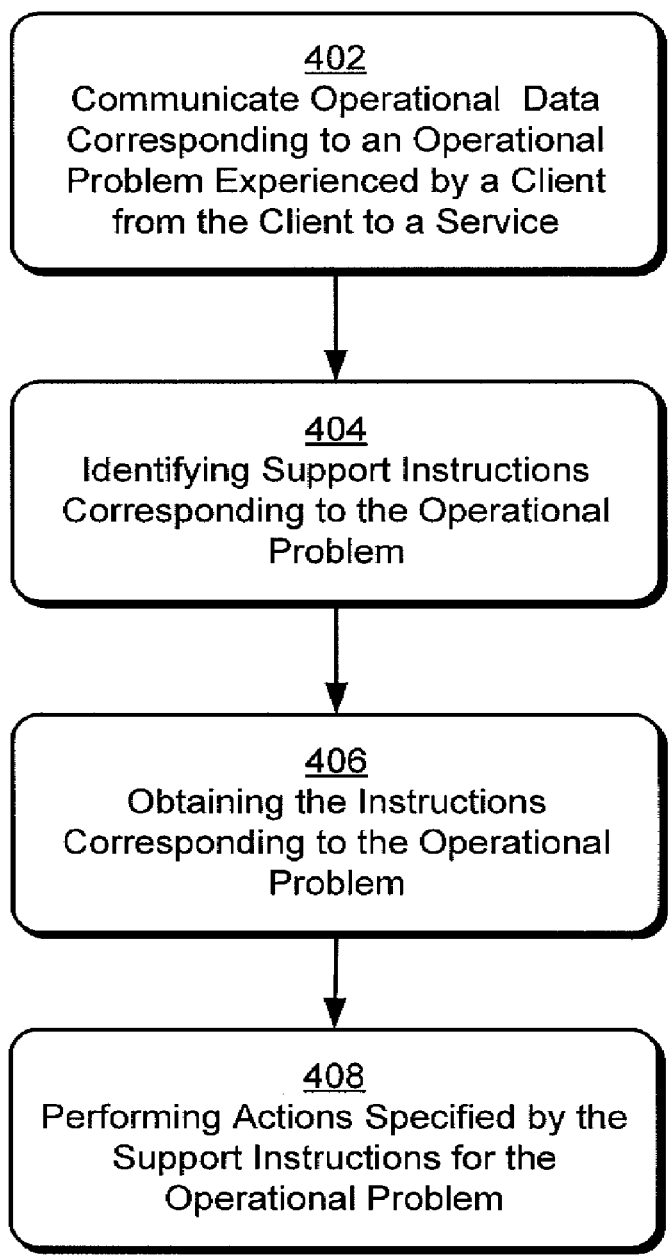
FIG. 4 is a flow diagram depicting a procedure in an exemplary implementation in which a client obtains support instructions corresponding to an operational problem experienced by the client.

FIG. 4 depicts a procedure 400 in an exemplary implementation in which a client provides operational data corresponding to an operational problem experienced by the client and receives support instructions corresponding to the problem. A client communicates data corresponding to an operational problem experienced by the client from the client to a service (block 402). For an illustrative example, assume now that a client 102(n) attempts to launch an internet browser. The browser fails to launch because of a registry error. A client support module 211 executing on a processor 208 of the client 102(n) may detect the error. In response the client support module 211 may collect a variety operational data 110 corresponding to the registry problem. The data may be communicated from the client 102(n) to the client care service 104(n) for example by the messaging module 212. As previously noted client 102(n) may provide a client id 214 along with the data as an identifier of the client 102(n), e.g., to associate the data with the client 102(n).

The client identifies support instructions corresponding to the operational problem (block 404). For example, in the previous registry error example, the service 104 upon receiving data from one or more clients 102(n) may produce a set of support instructions 118(k) for the particular registry error problem experience by the client 102(n). In one instance, the support instructions 118(k) have an associated set of client identifiers 232. These identifiers 232 which are associated with the support instructions 118(k) may correspond to unique identifiers 214 supplied by client 102(n) with operational data 110. Accordingly clients 102(n) may reference their unique identifiers 214 against identifiers 232 to identify relevant support instructions 118(k).

In an implementation, clients may use the previously described grouping to identify relevant (e.g. corresponding or targeted) support instructions 118(k). In this instance, the service 104 may provide notification to the client 102(n) that they have been added to a particular group. Again, the support instructions 118(k) may be associated with various groups 240. Accordingly, clients 102(n) may reference the particular group 240 to find relevant support instructions 118(k). In some cases the group 240 may correspond to or be formed on the basis of a particular problem. Thus, identifying the support instructions 118(k) associated with a group 240 may also provide instructions related to a specific problems, such as the registry error problem of the previous example.

In another implementation, client may be notified of a name or identifier for the particular problem (e.g., the registry error, a problem number and so on) which may be associated with support instructions 118(k), such as the problems 234 depicted in FIG. 2. In this case, support instructions 118(k) may correspond directly to a problem 234 and client may reference the problem 234, in addition to or in lieu of using a client or group identification.

As indicted previously, a broadcast messaging arrangement may be utilized for communications between the client 102(n) and service 104. In this case, when a service 104 produces or updates support instructions 118(k), a message may be posted (e.g., on server 202) which indicates that an update corresponding to a client, group or problem is available. Clients may poll the server to identify messages based upon an identifier, a grouping, the particular problem or the like. Polling may be a regular times, a user specified intervals, on demand (e.g. contemporaneous to or at a set time after a problems occurs) and so on. A variety of other communications between client and service suitable for identifying support instructions 118(k) corresponding to a client, group or problem are contemplated. In the present example, client 102(n) using one or more of the described techniques may identify support instructions 118(k) which correspond to the particular registry error the client experienced.

The client obtains the instructions corresponding to the operational problem (block 406). In an implementation, a posted broadcast message or other communication between the client 102(n) and service 104 may indicate a location where identified support instructions 118(k) may be retrieved. The client support module 211 may operate to obtain the instructions from the specified location. For instance, the identified support instructions 118(k) may be maintained accessible to clients 102(n) via network 106, such as on the server 202 of client care service 104. While a single server 202 is depicted, client care service 104 could be implemented via a plurality of servers, e.g. a server farm and accordingly the identified support instructions 118(k) may be maintained and retrieved from a variety of locations.

In an implementation, the service 104 may automatically provide support instructions relevant to the client, such as on the basis of a grouping. In this instance the client 102(n) and in particular the messaging module 212 may be configured to automatically receive support instructions 118(k) from the service 104, which may be stored in memory 210. In this instance, the previous identification step (block 404) may occur after the client receives the support instructions 118(k) locally, such as an identification of a particular set of support instructions 118(k) from a plurality of obtained and/or received support instructions 118(k) stored in memory 210. In other instances, the automatically received instructions may be considered or treated as automatically relevant by the client 102(n), or a reported problem and the client 102(n) may proceed to process the automatically received support instructions without performing the identification. In other words, the service 104 may determine relevance of instructions (e.g., identify corresponding instructions) prior to automatically sending the instructions and the client may accordingly omit the identification step.

The client performs the actions specified by the support instructions for the operational problem (block 408). For example, in the registry error example, corresponding support instructions 118(k) may be obtained and examined by the client support module 211. Actions 238 may be described in the instructions 118(k), such as actions 238 which will cause the erroneous registry entry to be deleted, edited, re-entered and so forth. Client support module 211 may operate to perform the specified actions 238 to troubleshoot and/or correct the registry error. Naturally, a variety of other actions 238 may be specified and performed for different operational problems. As previously described, client 102(n) may also provide feedback to the client care service 104 on whether the executed instructions solved or did not solve the problem. If the problem was not solved, an iterative process of providing data, identifying/obtaining instructions, performing actions and providing feed back may occur.

Figure 5:
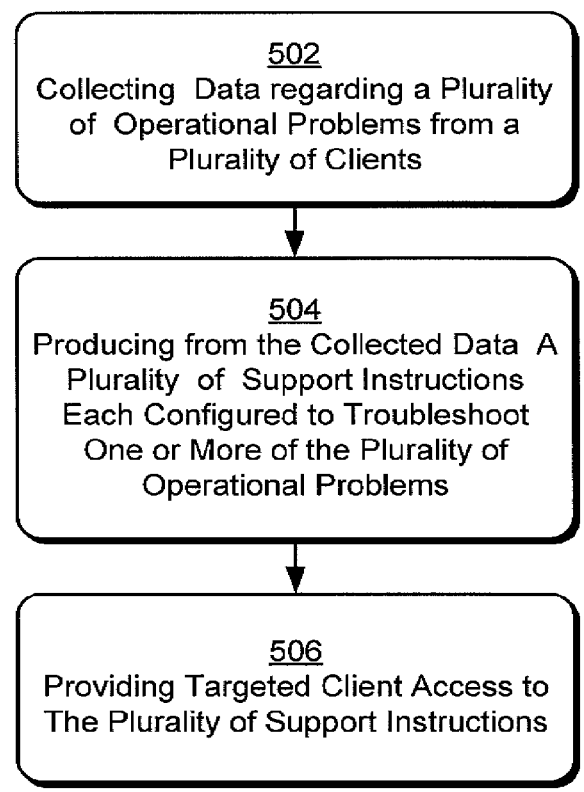
FIG. 5 is a flow diagram depicting a procedure in an exemplary implementation in which a service produces a plurality of support instructions from operational data collected from a plurality of clients and provides targeted client access to the support instructions.

FIG. 5 depicts a procedure 500 in an exemplary implementation in which a service provides support data to a plurality of clients on a targeted basis. When a client 102(n) encounters operational problem a variety of operational data 110 may be gathered by the client 102(n) for communication to a service configured to provide support for operational problems. The service collects data regarding a plurality of operational problems from a plurality of clients (block 502). For instance, a plurality of the clients 102(1)-102(N) in FIG. 1 may experience operational problems and provide operational data 110 corresponding to the problems to the client care service 104, which may be collected by the support manger module 116.

A plurality of sets of support instructions are produced from analysis of the collected data, each set configured to troubleshoot one or more of the operational problems (block 504). For example, the support manager module 116 may include functionality to perform a variety of analysis on the collected data. Analysis may include statistical analysis, matching clients to known problems, grouping clients on a variety of basis. From the operational data 110 a variety of distinct problems may be identified. As an example assume that data from a plurality of clients 102(1)-102(N) is analyzed to identify three problems, a registry error with an internet browser, a corrupted DLL file with a word processing application, and a conflict between a pair of media players. The support manager module 116 may be executed to produce support instructions 118(k) corresponding to each of the identified operational problems, which may be utilized by clients 102(1)-102(N) to troubleshoot the respective problems.

Then, the service provides the sets of instructions to corresponding clients on a targeted basis (block 506). Information may be included with each set of instructions 118(k) which defines which clients the set of instructions 118(k) are targeted to (e.g., targeting information describing the clients for which the instructions are relevant). Thus, rather than each client receiving the same support (e.g., global support), support may be targeted or tailored to specific clients, such on the basis of experience problems, a client grouping, and so on.

As noted in regards to FIG. 2 a variety of information may be included in support instructions which may be used by the service 104 and/or clients 102(1)-102(N) to match or to target certain support instructions 118(k) to corresponding clients 102(1)-102(N). For instance, operational data collected may include identifiers, such as client identifiers 214 which may also be included in support instructions 118(k) to match clients 102(1)-102(N) to sets of instructions. Further, support instructions 118(k) may correspond to particular groups, problems and so forth which may also be used for targeting of the instructions to particular clients. In this manner, a plurality of clients may receive targeted and tailored support rather than "cookie-cutter" or "one size fits all" support.

In an implementation, a multi-tier or hierarchy structure is employed for at least some of the sets of support instructions 118(k). For instance, service 104 may produce a master set of support instructions 118(k) configured to describe the relationship between a plurality of problems and a plurality of clients and to associate each of the problems with one or more other sets of support instructions. In addition, a variety of other sets of support instructions 118(k) are configured with the actions for troubleshooting the particular problem (or problems) to which the instructions are directed. Thus, rules 236 to associate a client with one or more problems and the actions 238 to address the problems may be divided among the master (rules) instructions and a plurality of other (action) instructions.

Accordingly, a client 102(n) may examine the master instructions to determine which of the other sets of instructions are applicable to client. For instance, a client may query the master using the unique client id 214 and determine that one or more corresponding sets of support instructions 118(k) are relevant and should be obtained. In an implementation, the client 102(n) accesses the master instructions from a remote location such as from memory 208 of client care service 104. Alternatively, the client's may download and store the master locally and may be provided with updates to the master periodically, on demand or so forth. In either arrangement, a client 102(n) may examine the master to identify relevant instructions 118(k) and then may obtain the relevant sets of instructions 118(k) and perform the specified actions.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
communicating data from a client to a service via a network, wherein the service processes the data to place the client providing the data into at least one group of clients;
receiving a set of support instructions to troubleshoot a particular operational problem reported to the service by a member of the group other than the client, wherein the instructions are sent automatically by the service to the client based upon the grouping;
applying rules, specified by the set of support instructions, to determine if the particular operational problem is present on the client,
when the problem is present, performing actions specified by the set of support instructions to troubleshoot the problem;
providing results to the service indicating whether the performed actions corrected the particular problem; and
when the problem is not corrected, automatically receiving an updated set of support instructions without user intervention to troubleshoot the particular operational problem, wherein the update is based upon results of the actions provided from one or more of the clients in the group.

2. A method as described in claim 1, wherein the instructions are received without the particular operational problem being experienced by the client.

3. A method described in claim 1, wherein the set of support instructions includes rules to determine if the operational problem is present on the client and identifies another corresponding set of support instructions specifying actions performable by the client to troubleshoot the particular operational problem, such that when the problem is present the client obtains the corresponding set of support instructions.

4. A method as described in claim 1, wherein the set of support instructions specify actions to take in response to the particular operational problem and the actions are performed automatically by the client without user input.

5. A method as described in claim 1, wherein clients are included in the group of clients based on common characteristics identified through processing of operational data provided by each client.

6. A computer-implemented method comprising:
   communicating operational data corresponding to an operational problem experienced by a client to a service;
   obtaining support instructions corresponding to the operational problem, wherein the support instructions include identifying information to target the support instructions to the client; and
   performing actions specified by the support instructions to troubleshoot the operational problem wherein:
      the identifying information comprises a group identifier corresponding to a group of clients in which the client is included by the service based upon other operational data communicated to the service by the client prior to the client experiencing the operational problem;
      the client receives notification of the group identifier from the service; and
      the client references the group identifier to obtain the support instructions corresponding to the operational problem.

7. A computer-implemented method as described in claim 6, wherein the identifying information comprises a client identifier corresponding to an identifier provided by the client when communicating the operational data to the service.

8. A computer-implemented method as described in claim 6, wherein the identifying information comprises a group identifier corresponding to a group of clients in which the client is included by the service based upon analysis of the communicated operational data.

9. A computer-implemented method as described in claim 6 further comprising:
   providing an anonymous client identifier with the communicated operational data, wherein the client identifier is associated by the service with the operational problem; and
   referencing the anonymous identifier to identify the support instructions.

10. A computer-implemented method as described in claim 6, further comprising polling the service to find a message posted by the service, wherein the message matches the client to the operational problem and identifies corresponding support instructions to troubleshoot the operational problem.

11. A computer-implemented method as recited in claim 10, wherein the polling is performed at regular intervals to determine if a relevant message is posted.

12. A method as described in claim 6 further comprising:
   receiving notification of the identifying information utilized by the service to target the support instructions to the client, wherein the service analyzes operational data collected from a plurality of clients to determine the identifying information and includes the identifying information in the support instructions to target the support instructions to the plurality of clients; and
   referencing the identifying information to obtain the targeted support instructions.

13. A method comprising:
   collecting data regarding a plurality of operational problems from a plurality of clients;
   producing from the collected data a plurality of support instructions each configured to troubleshoot one or more of the plurality of operational problems; and
   providing targeted client access to the plurality of support instructions, wherein the support instructions include:
      a first set of support instructions providing rules matching the plurality of clients to the plurality of operational problems, and
      one or more additional sets of instructions each corresponding to one or more of the plurality of operational problems and providing a set of actions for addressing respective problems, wherein the clients apply the rules to determine which of the one or more additional sets of instructions are applicable.

14. A method as described in claim 13, wherein the targeted client access occurs via targeting information included with the support instructions which identifies one or more of the plurality of clients to which the support instructions are applicable.

15. A method as described in claim 14, wherein the targeting information is selected from the group consisting of:
   a group identification;
   a client identifier; and
   an operational problem identifier.

16. A method as described in claim 13, wherein:
   the collected data is analyzed by the service to form a plurality of groups of clients;
   the plurality of support instructions are configured to correspond to one or more of the plurality of groups; and
   the providing targeted client access comprises communicating to clients in each respective group support instructions corresponding the group.

* * * * *